United States Patent

Hayashi et al.

[11] Patent Number: 5,775,360
[45] Date of Patent: Jul. 7, 1998

[54] PRESSURE CONTROL VALVE

[75] Inventors: Tetsuji Hayashi; Shiniti Osawa, both of Gifu-ken, Japan

[73] Assignee: Kayaba Industry Co., Ltd., Tokyo, Japan

[21] Appl. No.: 594,706

[22] Filed: Jan. 31, 1996

[51] Int. Cl.[6] ............................................ F16K 15/04
[52] U.S. Cl. ............................ 137/115.05; 137/115.1; 137/315; 137/539.5
[58] Field of Search ................... 137/115.05, 115.09, 137/115.1, 539, 539.5, 315

[56] References Cited

U.S. PATENT DOCUMENTS

| | | | |
|---|---|---|---|
| 3,426,785 | 2/1969 | Brady et al. | 137/115.05 |
| 3,854,557 | 12/1974 | Wilcox | 137/539 X |
| 4,446,886 | 5/1984 | Taylor et al. | 137/539.5 X |
| 5,170,626 | 12/1992 | Ohtaki et al. | 137/115.09 X |
| 5,333,454 | 8/1994 | Nikaido | 137/115.09 X |

*Primary Examiner*—Stephen M. Hepperle
*Attorney, Agent, or Firm*—Steinberg, Raskin & Davidson, P.C.

[57] ABSTRACT

The invention provides a pressure control valve which can be made of aluminum as much as possible and has a comparatively light weight and wherein a seat member made of steel can be force fitted into a spool of aluminum at a room temperature. The pressure control valve includes a relief valve in a spool which is formed from aluminum. A sleeve made of steel is force fitted at a room temperature into a portion of an inner face of the spool in which a seat is inserted. The end portion of the spool in which the seat is inserted is bent by caulking to prevent coming off of the seat.

3 Claims, 4 Drawing Sheets

PRESSURE CONTROL VALVE

BACKGROUND OF THE INVENTION

1. Field of the Invention

This invention relates generally to a pressure control valve for use to supply pressure oil to a power steering apparatus, and more particularly to a pressure control valve which is partially made of aluminum so that it has a comparatively light weight.

2. Description of the Related Art

A typical one of conventional pressure control valves is shown in longitudinal section in FIG. 4.

Referring to FIG. 4, a body 1 made of aluminum has a pump port P and a bypass port B formed therein and further has a spool hole 2 formed therein. A spool 3 made of aluminum is fitted for sliding movement in the spool hole 2. A connector 4 is inserted in an end portion of the spool hole 2, and a through-hole 4a formed in the connector 4 is connected to a power steering apparatus not shown. Thus, in the arrangement shown, the connector 4 serves as an actuator port. At the other end of the spool hole 2, the spool 3 and the spool hole 2 cooperate with each other to form a pressure chamber 5. A compression spring 6 is accommodated in the pressure chamber 5 such that its spring force acts upon the spool 3.

A member 7 is fitted in the through-hole 4a of the connector 4, and a rod 8 secured to the spool 3 extends through a communication hole 7a formed in the member 7. The communication hole 7a and the rod 8 cooperate with each other to form a variable orifice 9. Pressure oil on the downstream side of the variable orifice 9 is introduced into the pressure chamber 5 through an oil passage formed from a pressure sensing path 11, a path 10 and a small hole 12.

A relief valve formed from a spring 13, a ball support 14, a steel ball 15 and a seat member 16 made of steel is located in the spool 3.

In operation, when a pump not shown starts its rotation, pressure oil is supplied from the pump port P to the power steering apparatus not shown past the variable orifice 9 through the through-hole 4a.

In this instance, by such circulation of the pressure oil, a pressure difference is produced between the opposite sides, that is, the upstream and downstream sides, of the variable orifice 9. Then, the pressure on the upstream side of the variable orifice 9 acts upon the right-hand side end in FIG. 4 of the spool 3 while the pressure on the downstream side of the variable orifice 9 acts upon the left-hand end in FIG. 4 of the spool 3 through the oil passage described above.

Then, as the speed of rotation of the pump rises, the pressure difference on the opposite sides of the variable orifice 9 increases, and the spool 3 is moved leftwardly in FIG. 4 by the pressure difference. As the amount of movement of the spool 3 increases, also the opening through which the pump port P and the bypass port B are communicated with each other increases, and consequently, the amount of pressure oil which escapes from the bypass port B increases as much.

However, when the load pressure on the through-hole 4a side rises in such a case as upon rest swinging of a steering element, also the pressure on the pressure chamber 5 side is raised by such pressure rise. Consequently, the spool 3 is moved back in the rightward direction in FIG. 4, whereupon the opening of the communication path between the pump port P and the bypass port B is decreased. In short, the spool 3 supplies a required flow rate of pressure oil to the steering apparatus side and allows an excessive flow rate of pressure oil to escape from the bypass port in response to the load pressure of the steering apparatus side.

As described above, the relief valve is located in the spool 3. Oil to be supplied to the power steering apparatus, that is, pressure oil in the pressure chamber 5, passes through a small through-hole 16a of the seat member 16, and the pressure of the pressure oil acts upon the steel ball 15 seated on a seat face 16b of the seat member 16.

Then, if the load to the power steering apparatus side rises until the pressure mentioned above becomes higher than a preset relief pressure value, the pressure oil pushes the steel ball 15 to open so that it escapes to the bypass port B through a path 3b in the spool 3. The relief pressure is set by the spring force of the spring 13.

Further, when the relief valve is opened so that a large flow of pressure oil is produced in the pressure sensing path 11, the pressure of the pressure chamber 5 decreases suddenly. As a result, the spool 3 is moved by a great amount in the leftward direction in FIG. 4, and consequently, the pressure oil is allowed to escape by a greater amount to the bypass port B and the pressure of oil to be supplied to the power steering apparatus is prevented from being raised any more.

In the pressure control valve of the construction described above, the body 1 and the spool 3 are made of aluminum in order that the pressure control valve may be formed with a comparatively small weight. However, the steel ball 15 and the seat member 16 are made of steel, which is a hard material, attaching importance to the durability.

However, if the components of the pressure control valve are heated to a high temperature by an influence of the temperature of oil or the like, then since they have different coefficients of thermal expansion, the inner diameter of a seat member insertion hole 3a becomes larger than the outer diameter of the seat member 16. Therefore, if the seat member 16 is merely force fitted in the seat member insertion hole 3a, then when the temperature rises high, the seat member 16 may be displaced, or in an extreme case, the seat member 16 may come off from the seat member insertion hole 3a.

If the seat member 16 is displaced, then since the set length of the spring 13 is varied by such displacement, also the relief pressure is varied.

Therefore, it is a conventional practice to insert and secure the seat member 16 into and to the spool 3 in a screwed fashion.

With the pressure control valve of the construction described above, however, since the seat member made of steel is inserted in and secured to the spool in a screwed fashion as described above, depending upon the finally fastened position, the seat member has an influence of the amount of deformation of the spring 13 and consequently has an influence upon the preset pressure of the relief valve.

It may seem a possible idea to interpose an adjustment member such as shim between the seat member and the spool. However, even if such adjustment member to be interposed is employed, there is another problem in that much time is actually required for such adjustment and also automation on a production line is difficult.

Furthermore, screw thread cutting is required for the seat member. Consequently, there is a further problem in that a high working cost is required and the seat member cannot be produced by such an inexpensive process as sintering and thus requires a high part cost.

SUMMARY OF THE INVENTION

It is an object of the present invention to provide a pressure control valve which can be made of aluminum as much as possible and has a comparatively light weight.

It is another object of the present invention to provide a pressure control valve wherein a seat member made of steel can be force fitted into a spool of aluminum at a room temperature.

In order to attain the objects described above, according to an aspect of the present invention, there is provided a pressure control valve, comprising a body made of aluminum and having a pump port, an actuator port and a bypass port formed therein, the body further having a spool hole formed therein, a spool made of aluminum fitted for sliding movement in the spool hole of the body, an orifice provided intermediately in an oil flow path between the pump port and the actuator port, a pressure chamber formed at an end portion of the body remote from the orifice and defined by the spool and the spool hole, an oil passage for introducing pressure oil on the downstream side of the orifice into the pressure chamber, a spring for exerting a spring force to the spool, the spool having a seat member insertion hole formed at an end portion thereof adjacent the pressure chamber, a seat member made of steel and filled in the seat member insertion hole, a relief valve including a poppet made of steel and resiliently pressed against a seat portion of the seat member, the relief valve being opened, when the pressure in the pressure chamber and on the downstream side of the orifice becomes higher than a preset pressure, to allow pressure oil to partially escape to the bypass port, and a sleeve made of steel and force fitted in the seat member insertion hole at a room temperature, the seat member of steel being force fitted in the sleeve, an end portion of the spool around the seat member insertion hole being caulked to secure the sleeve in the seat member insertion hole.

In the pressure control valve, since the sleeve made of steel and force fitted in the seat member insertion hole is fastened at the end portion thereof by the caulked bent portion of the spool, even if the force fitting force of the sleeve in a radial direction is decreased due to a difference in coefficient of thermal expansion between aluminum and steel, the displacement of the sleeve in its axial direction is restricted to the minimum. Where the movement of the sleeve in its axial direction is restricted to the minimum, also an error in set pressure of the relief valve can be suppressed to its minimum value. Besides, since the sleeve and the seat member are made of the same material of steel, they have an equal coefficient of thermal expansion. Accordingly, even if they are heated to a high temperature, the force fitting margin of the seat member is still maintained.

Consequently, with the pressure control valve, since most components are made of aluminum, the pressure control valve is reduced in weight as far as possible. Further, even if the seat member made of steel is force fitted at a room temperature into the spool made of aluminum, the seat member is not displaced out of position or does not come off even if the temperature rises high. Accordingly, the seat member need not be worked to form screw threads thereon which are otherwise required for secure positioning and for prevention of coming off of the same, which makes automation in assembly of the apparatus possible. Furthermore, the seat member can be produced by an inexpensive method such as sintering, and no thermal energy is required for force fitting. Consequently, the cost for the pressure control valve can be reduced. Also the adjustment of the relief pressure which depends upon the position of the seat is simplified.

Preferably, the spool has a cutaway portion formed at a land portion thereof for allowing excess thickness of the spool, which is produced by deformation of the spool when the seat member is force fitted into the spool, to escape into the cutaway portion. Where the cutaway portion is formed at the land portion of the spool, excess thickness of the spool which is produced when it is force fitted into the spool can be allowed to escape by the cutaway portion. Consequently, otherwise possible deformation of the spool can be prevented. As a result, such a situation that the sliding face of the spool is influenced by deformation of the spool can be prevented, and smooth movement of the spool is assured.

According to another aspect of the present invention, there is provided a pressure control valve, comprising a body made of aluminum and having a pump port, an actuator port and a bypass port formed therein, the body further having a spool hole formed therein, a spool made of aluminum fitted for sliding movement in the spool hole of the body, an orifice provided intermediately in an oil flow path between the pump port and the actuator port, a pressure chamber formed at an end portion of the body remote from the orifice and defined by the spool and the spool hole, an oil passage for introducing pressure oil on the downstream side of the orifice into the pressure chamber, a spring for exerting a spring force to the spool, the spool having a seat member insertion hole formed at an end portion thereof adjacent the pressure chamber, a seat member made of steel and fitted in the seat member insertion hole, a relief valve including a poppet made of steel and resiliently pressed against a seat portion of the seat member, the relief valve being opened, when the pressure in the pressure chamber and on the downstream side of the orifice becomes higher than a preset pressure, to allow pressure oil to partially escape to the bypass port, and a sleeve made of steel and force fitted at a room temperature on an outer periphery of a portion of the spool corresponding to the seat member insertion hole, the seat member being force fitted in the seat member insertion hole.

In the pressure control valve, since the sleeve made of steel is force fitted on the outer periphery of the portion of the spool corresponding to the seat member insertion hole, deformation of the portion of the spool corresponding to the seat member insertion hole in a radial direction by thermal expansion can be restricted by the sleeve of steel having a low coefficient of thermal expansion. Accordingly, expansion of the portion of the spool of aluminum surrounded by the sleeve can be suppressed substantially equal to that of steel.

Consequently, with the pressure control valve, since most components are made of aluminum, the pressure control valve is reduced in weight as far as possible. Further, even if the seat member made of steel is force fitted at a room temperature into the spool made of aluminum, the seat member is not displaced out of position or does not come off even if the temperature rises high. Accordingly, the seat member need not be worked to form screw threads thereon which are otherwise required for securely positioning and for prevention of coming off of the same, which makes automation in assembly of the apparatus possible. Furthermore, the seat member can be produced by an inexpensive method such as sintering, and no thermal energy is required for force fitting. Consequently, the cost for the pressure control valve can be reduced. Also the adjustment of the relief pressure which depends upon the position of the seat is simplified.

The above and other objects, features and advantages of the present invention will become apparent from the following description and the appended claims, taken in conjunction with the accompanying drawings in which like parts or elements are denoted by like reference characters.

DESCRIPTION OF THE PREFERRED EMBODIMENTS

Figure 1:
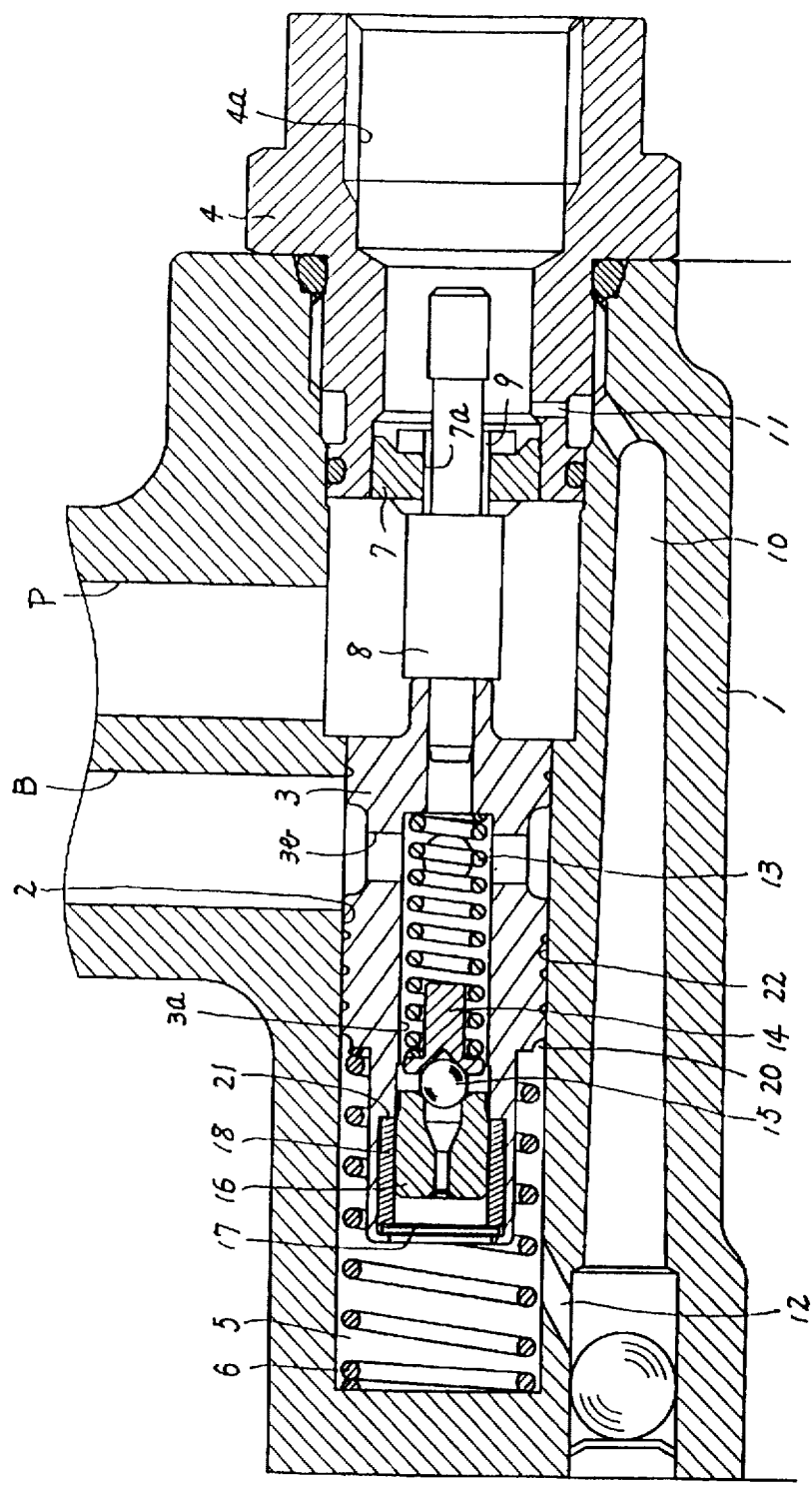
FIG. 1 is a longitudinal sectional view of a pressure control valve showing a first preferred embodiment of the present invention.
Figure 2:
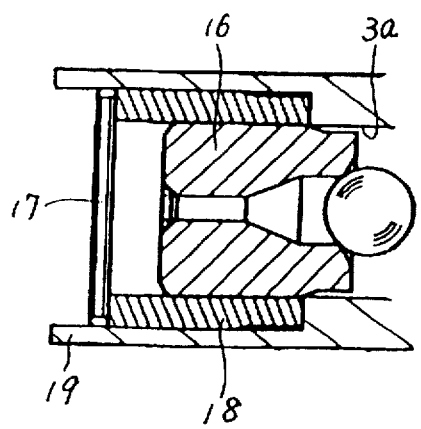
FIG. 2 is a partial sectional view of the pressure control valve of FIG. 1.
Figure 4:
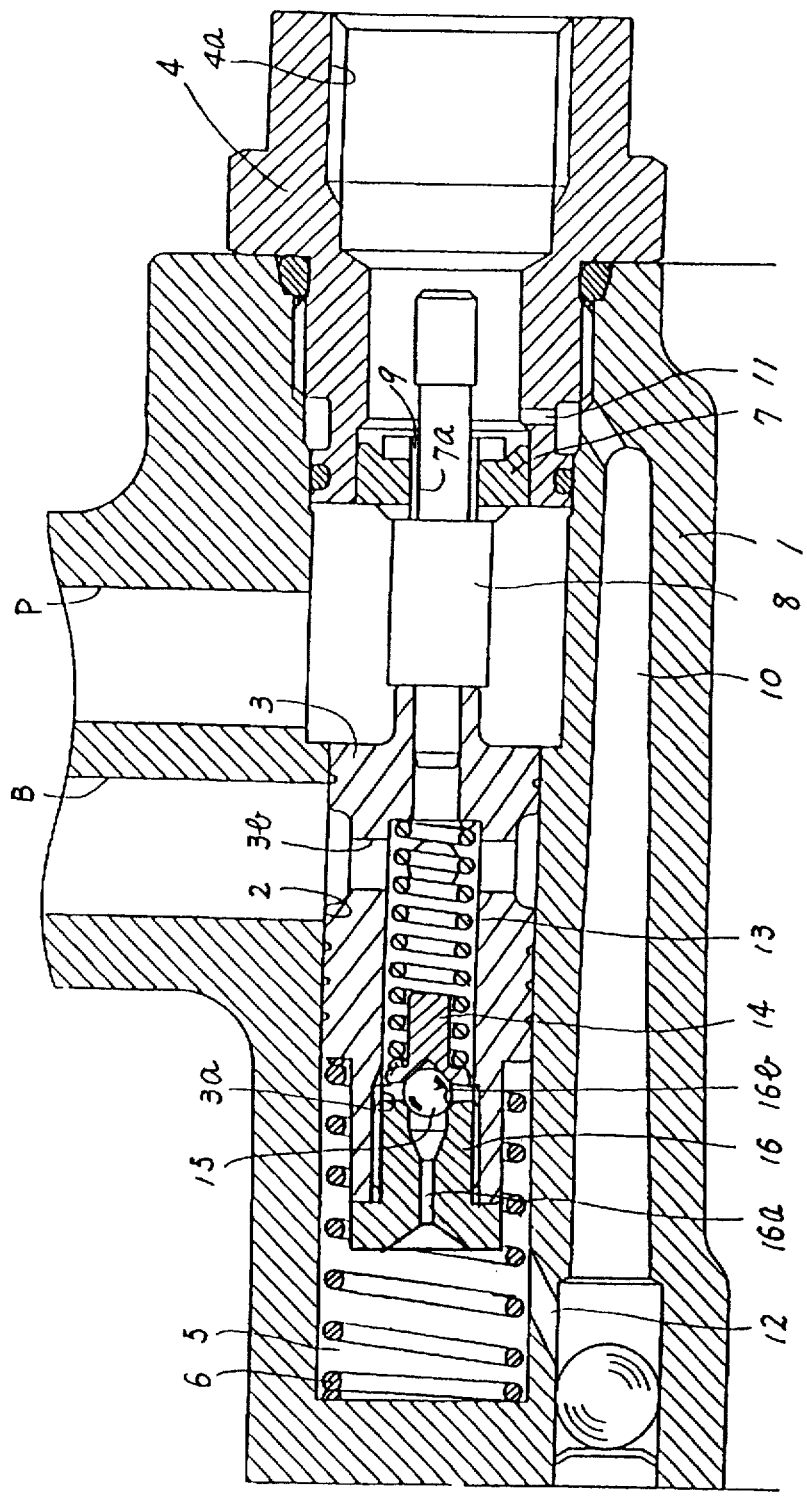
FIG. 4 is a longitudinal sectional view of a conventional pressure control valve.

Referring first to FIGS. 1 and 2, there is shown a pressure control valve according to a first preferred embodiment of the present invention. The pressure control valve shown is an improvement to and includes several common components with the conventional pressure control valve described hereinabove with reference to FIG. 4. In particular, the pressure control valve includes a body 1 and a spool 3 both made of aluminum similarly as in the conventional pressure control valve. The spool 3 has a seat member insertion hole 3a formed at an end portion thereof adjacent a pressure chamber 5, and has a stepped portion 21 formed at an inner end of the seat member insertion hole 3a. A sleeve 18 made of steel is force fitted to the position of the stepped portion 21 in the seat member insertion hole 3a.

A spring 13, a ball support 14 and a steel ball 15 are inserted in the spool 3 to form a relief valve in a similar manner as in the conventional pressure control valve.

A seat member 16 made of steel is force fitted in the sleeve 18 such that the amount of deformation of the spring 13 is set depending upon the press fitted position of the seat member 16.

A filter 17 is fitted on the sleeve 18. When the filter 17 is fitted in this manner, a caulking portion 19 is left at an end portion of the spool 3 around the seat member insertion hole 3a as seen in FIG. 2.

Then, the end of the caulking portion 19 is forced to be bent inwardly to caulk the caulking portion 19 to prevent the sleeve 18 from coming off the spool 3.

Further, as shown in FIG. 1, a cutaway portion 20 is formed at a land portion 22 of the sleeve 18. When the seat member 16 is force fitted into the spool 3, some excess thickness of aluminum, which is a soft material, is normally produced on the spool 3. However, with the pressure control valve described above, such excess thickness can escape into the cutaway portion 20, and consequently, otherwise possible deformation of the sliding surface of the spool 3 can be prevented.

With the pressure control valve of the present embodiment, even if the components are heated to a high temperature by a rise of the temperature of oil to decrease the pressure fitting margin between the sleeve 18 and the seat member insertion hole 3a, since the sleeve 18 is retained by the caulked end portion of the spool 3, it is not moved in an axial direction or does not come off the seat member insertion hole 3a.

Further, since the seat member 16 is force fitted in the sleeve 18 similarly made of steel, even if the temperatures of them rise, the force fitting margin between them is not reduced. Accordingly, the seat member 16 does not come off the sleeve 18 or is not displaced out of position.

In this manner, since the position of the seat member 16 can be maintained accurately even if it is force fitted, the seat member 16 need not be worked to form screw threads around the same in order to fix the seat member 16 in position and prevent otherwise possible coming off of the seat member 16.

It is to be noted that the sleeve 18 is small in size comparing with the entire apparatus and does not deteriorate the weight reduction effect by employment of aluminum for the apparatus.

Figure 3:
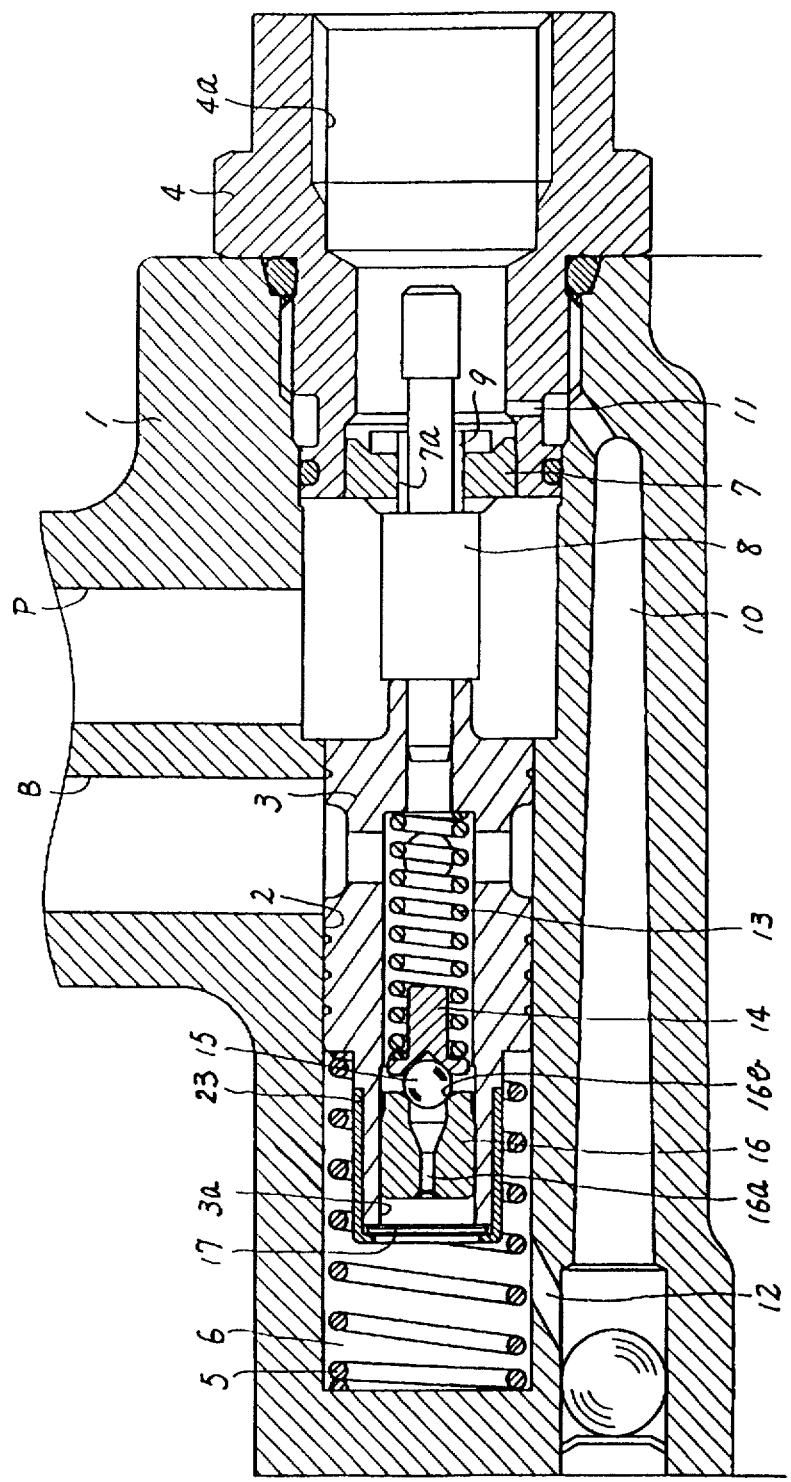
FIG. 3 is a longitudinal sectional view of another pressure control valve showing a second preferred embodiment of the present invention.

Referring now to FIG. 3, there is shown a pressure control valve according to a second preferred embodiment of the present invention. The pressure control valve of the present embodiment is a modification to and includes common components with the pressure control valve of the preceding embodiment described hereinabove with reference to FIGS. 1 and 2. In the pressure control valve of the present embodiment, a sleeve 23 made of steel is force fitted on an outer periphery of a portion of a spool 3 corresponding to a seat member insertion hole 3a, and a seat member 16 is force fitted in the seat member insertion hole 3a. Then, an end portion of the sleeve 23 is bent by caulking to fasten a filter 17 to the spool 3.

With the pressure control valve of the second embodiment, expansion of the spool 3 in a high temperature condition is restricted by the sleeve 23. Accordingly, although the seat member 16 made of steel is forced fitted in the spool 3, otherwise possible displacement or coming off of the seat member 16 can be prevented. Accordingly, also with the pressure control valve of the present embodiment, the seat member 16 need not be worked to form screw threads thereon, different from the control pressure control valve.

In the pressure control valves of the first and second embodiments described above, the variable orifice located on the connector 4 side may have any construction. Further, the variable orifice may be replaced with a fixed orifice.

Further, while the relief valve employs the steel ball 15 as a poppet, it may be replaced with a relief valve of the ordinary poppet type. Where a relief valve of the poppet type is employed, naturally the ball support 14 can be eliminated.

Further, in the pressure control valve of the first embodiment, since the sleeve 18 made of steel and force fitted in the seat member insertion hole 3a is retained by the caulked end portion of the spool 3, although the aluminum and the steel have different coefficients of thermal expansion, the displacement of the sleeve in its axial direction is restricted to its minimum amount. Where the axial displacement of the sleeve is restricted to its minimum value, also an error of the preset value of the relief valve can be restricted to its minimum value. Besides, since the sleeve 18 and the seat member 16 are made of the same material of steel, they have an equal coefficient of thermal expansion. Accordingly, even if they are heated to a high temperature, the force fitting margin of the seat member 16 is maintained, and consequently, the seat member 16 will not come off.

Further, since local excess thickness which is produced when the sleeve 18 and the seat member are force fitted into the spool 3 can escape into the cutaway portion 20 formed at the land portion 22 of the spool 3, deformation of the sliding face of the spool 3 by the excess thickness can be prevented.

On the other hand, in the pressure control valve of the second embodiment, since the sleeve 23 made of steel is fitted on the outer periphery of the portion of the spool 3 corresponding to the seat member insertion hole 3a, the thermal expansion of the sleeve portion can be suppressed to a value substantially equal to that of the thermal expansion of the steel. Accordingly, at the portion held by the sleeve, the expansion is substantially equal to that of the steel. Consequently, the force fitting margin between the seat member insertion hole 3a and the seat member 16 is substantially maintained, and accordingly, the seat member 16 is not displaced or does not come off the seat member insertion hole 3a.

Having now fully described the invention, it will be apparent to one of ordinary skill in the art that many changes and modifications can be made thereto without departing from the spirit and scope of the invention as set forth herein.

What is claimed is:

1. A pressure control valve, comprising:
    a body made of aluminum and having a pump port, an actuator port and a bypass port formed therein, said body further having a spool hole formed therein;
    a spool made of aluminum fitted for sliding movement in said spool hole of said body;
    an orifice provided intermediately in an oil flow path between said pump port and said actuator port;
    a pressure chamber formed at an end portion of said body remote from said orifice and defined by said spool and said spool hole;
    an oil passage for introducing pressure oil on the downstream side of said orifice into said pressure chamber;
    a spring for exerting a spring force to said spool;
    said spool having a seat member insertion hole formed at an end portion thereof adjacent said pressure chamber;
    a seat member made of steel and fitted in said seat member insertion hole;
    a relief valve including a poppet made of steel and resiliently pressed against a seat portion of said seat member;
    said relief valve being opened, when the pressure in said pressure chamber and on the downstream side of said orifice becomes higher than a preset pressure, to allow pressure oil to partially escape to said bypass port; and
    a sleeve made of steel and force fitted in said seat member insertion hole at a room temperature;
    said seat member of steel being force fitted in said sleeve;
    an end portion of said spool around said seat member insertion hole being caulked to secure said sleeve in said seat member insertion hole.

2. A pressure control valve as claimed in claim 1, wherein said spool has a cutaway portion formed at a land portion thereof for allowing excess thickness of said spool, which is produced by deformation of said spool when said seat member is force fitted into said spool, to escape into said cutaway portion.

3. A pressure control valve, comprising:
    a body made of aluminum and having a pump port, an actuator port and a bypass port formed therein, said body further having a spool hole formed therein;
    a spool made of aluminum fitted for sliding movement in said spool hole of said body;
    an orifice provided intermediately in an oil flow path between said pump port and said actuator port;
    a pressure chamber formed at an end portion of said body remote from said orifice and defined by said spool and said spool hole;
    an oil passage for introducing pressure oil on the downstream side of said orifice into said pressure chamber;
    a spring for exerting a spring force to said spool;
    said spool having a seat member insertion hole formed at an end portion thereof adjacent said pressure chamber;
    a seat member made of steel and fitted in said seat member insertion hole;
    a relief valve including a poppet made of steel and resiliently pressed against a seat portion of said seat member;
    said relief valve being opened, when the pressure in said pressure chamber and on the downstream side of said orifice becomes higher than a preset pressure, to allow pressure oil to partially escape to said bypass port; and
    a sleeve made of steel and force fitted at a room temperature on an outer periphery of a portion of said spool corresponding to said seat member insertion hole;
    said seat member being force fitted in said seat member insertion hole.

* * * * *